United States Patent [19]

Lu

[11] Patent Number: 5,553,300
[45] Date of Patent: Sep. 3, 1996

[54] SEMICONDUCTOR MICROSCOPE DATA INTERFACE FOR COMPUTER

[75] Inventor: Wen-Chong Lu, Hsin-Chu County, Taiwan

[73] Assignee: United Microelectronics Corporation, Hsin-Chu, Taiwan

[21] Appl. No.: 233,643

[22] Filed: Apr. 26, 1994

[51] Int. Cl.[6] .................................................. G06F 13/14
[52] U.S. Cl. ........................ 395/821; 395/892; 395/309; 395/733; 364/238.3; 364/241.7; 364/235.7; 364/DIG. 1
[58] Field of Search .................................... 395/275, 325, 395/821, 892, 309, 733; 84/1.03; 375/110; 356/359, 358

[56] References Cited

U.S. PATENT DOCUMENTS

| | | | |
|---|---|---|---|
| 4,369,516 | 1/1983 | Byrns | 375/110 |
| 4,700,604 | 10/1987 | Morikawa et al. | 84/1.03 |
| 5,204,734 | 4/1993 | Cohen et al. | 356/359 |
| 5,339,395 | 8/1994 | Pickett et al. | 395/325 |

*Primary Examiner*—Christopher B. Shin
*Attorney, Agent, or Firm*—Meltzer, Lippe, Goldstein, et al.

[57] ABSTRACT

An interface for connecting the printer port of an SEM microscope to a computer is disclosed. The interface includes a latch for receiving data outputted from the printer port of the microscope, an I/O controller and a flip-flop circuit. The I/O controller is for transferring data from the latch to a computer bus. The I/O controller also presets a busy flag to a state which indicates that the I/O interface is idle. In addition, the I/O controller outputs an acknowledge signal to the microscope printer port in response to receiving an interrupt request signal therefrom. The flip-flop circuit is for storing the busy flag. In response to a strobe signal, the flip-flop circuit changes the busy signal to indicate that the I/O controller is busy transferring data. Furthermore, the flip-flop circuit is for enabling the latch to store data transferred from the microscope printer port, in response to the strobe signal.

4 Claims, 3 Drawing Sheets

5,553,300

SEMICONDUCTOR MICROSCOPE DATA INTERFACE FOR COMPUTER

FIELD OF THE INVENTION

The present invention is related to computer interfaces. In particular, it relates to connecting the printer port of a sophisticated semiconductor microscope to the input/output (I/O) expansion bus of a computer.

BACKGROUND OF THE INVENTION

FIG. 1 shows a simple block diagram of an SEM microscope 100 manufactured by Hitachi of a critical dimension (CD) measurement system. A semiconductor CD can be prepared using a computer. A prototype semiconductor chip specimen can then be made and examined using the SEM microscope 100 to evaluate its CD. For example, the SEM microscope 100 has a computer 110 which is capable of measuring the line width of different structures and regions formed on the semiconductor chip specimen. These measurements may be displayed on a display device of the SEM microscope 100 or printed on a printer 120 connected to the printer port 112 of the computer 110.

The problem with the SEM microscope 100 is that the computer 110 cannot be connected directly to the CD data collecting computer on which the CD was prepared. Instead, the operator must manually re-enter data outputted from the SEM microscope 100 into the computer used to prepare the CD. As a result, the data transfer is time consuming and prone to errors.

It is therefore an object of the present invention to provide an interface for connecting the SEM microscope to a computer.

SUMMARY OF THE INVENTION

These and other objects are achieved by the present invention which provides an interface for connecting the printer port of a semiconductor microscope to a computer. The interface includes a latch for receiving data outputted from the printer port of the microscope, an I/O controller and a flip-flop circuit. The I/O controller is for transferring data from the latch to a computer bus. In addition, the I/O controller outputs an acknowledge signal to the microscope printer port in response to receiving an interrupt request signal therefrom. The flip-flop circuit is for storing a busy flag therein. The I/O controller can preset the busy flag in the flip-flop circuit to a state which indicates that the I/O interface is idle, (i.e., not busy) after transferring the data from the latch to the bus. In response to a strobe signal outputted from the printer port, the flip-flop circuit changes the busy flag stored therein to indicate that the I/O controller is busy transferring data from the latch to the computer bus. Furthermore, the flip-flop circuit is for enabling the latch to store data transferred from the microscope printer port in response to the strobe signal.

In short, a simple interface for connecting an SEM microscope printer port to a bus of a CD computer is provided.

DETAILED DESCRIPTION OF THE INVENTION

Figure 2:
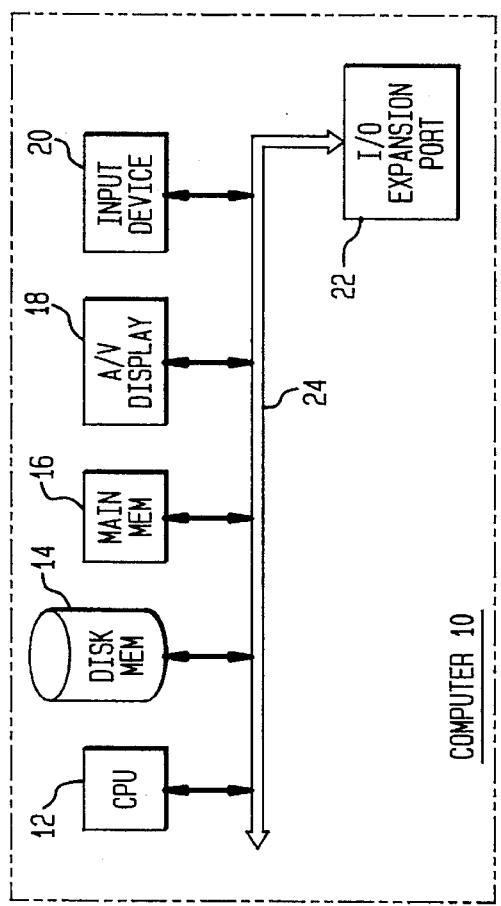
FIG. 2 shows a conventional computer on which a CD can be prepared.
Figure 1:
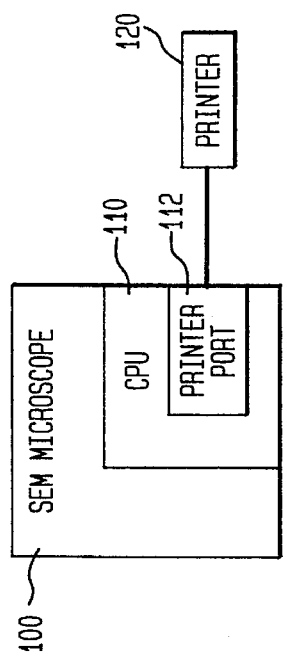
FIG. 1 shows a conventional SEM microscope.

FIG. 2 shows a conventional computer 10 on which a CD may be prepared and to which the microscope 100 of FIG. 1 may be connected. The computer 10 has a processor or CPU 12 for executing instructions, a disk memory 14, a main memory 16, an audio/video display system 18, an input device 20 (such as a keyboard, mouse, etc.) and an I/O expansion port 22. The computer system 10 also has a bus 24 interconnecting the aforementioned devices 12–22.

Figure 3A:
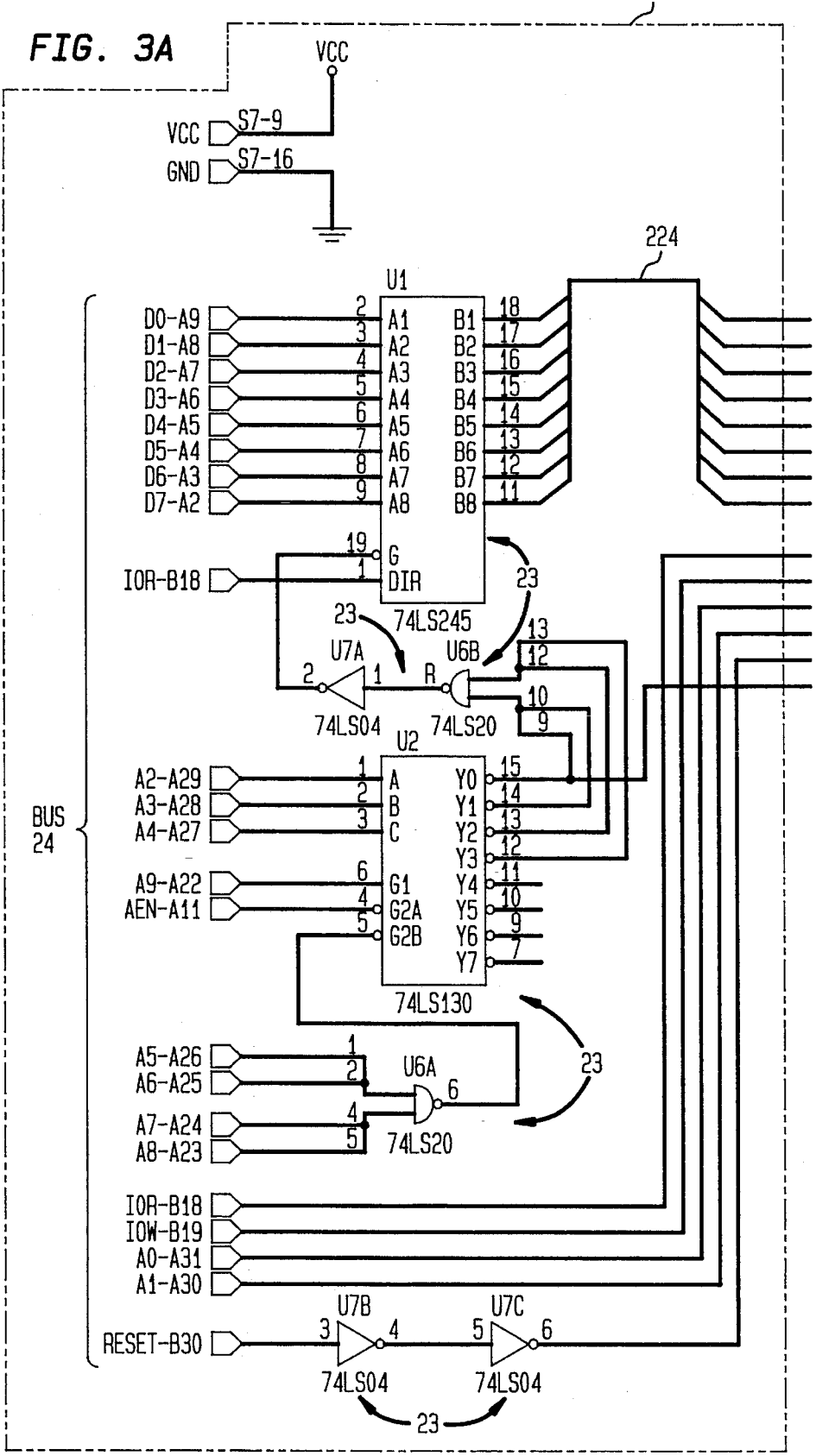
FIG. 3 shows an interface for interconnecting the microscope of FIG. 1 to a bus of the computer of FIG. 2.
Figures 3, 3B:
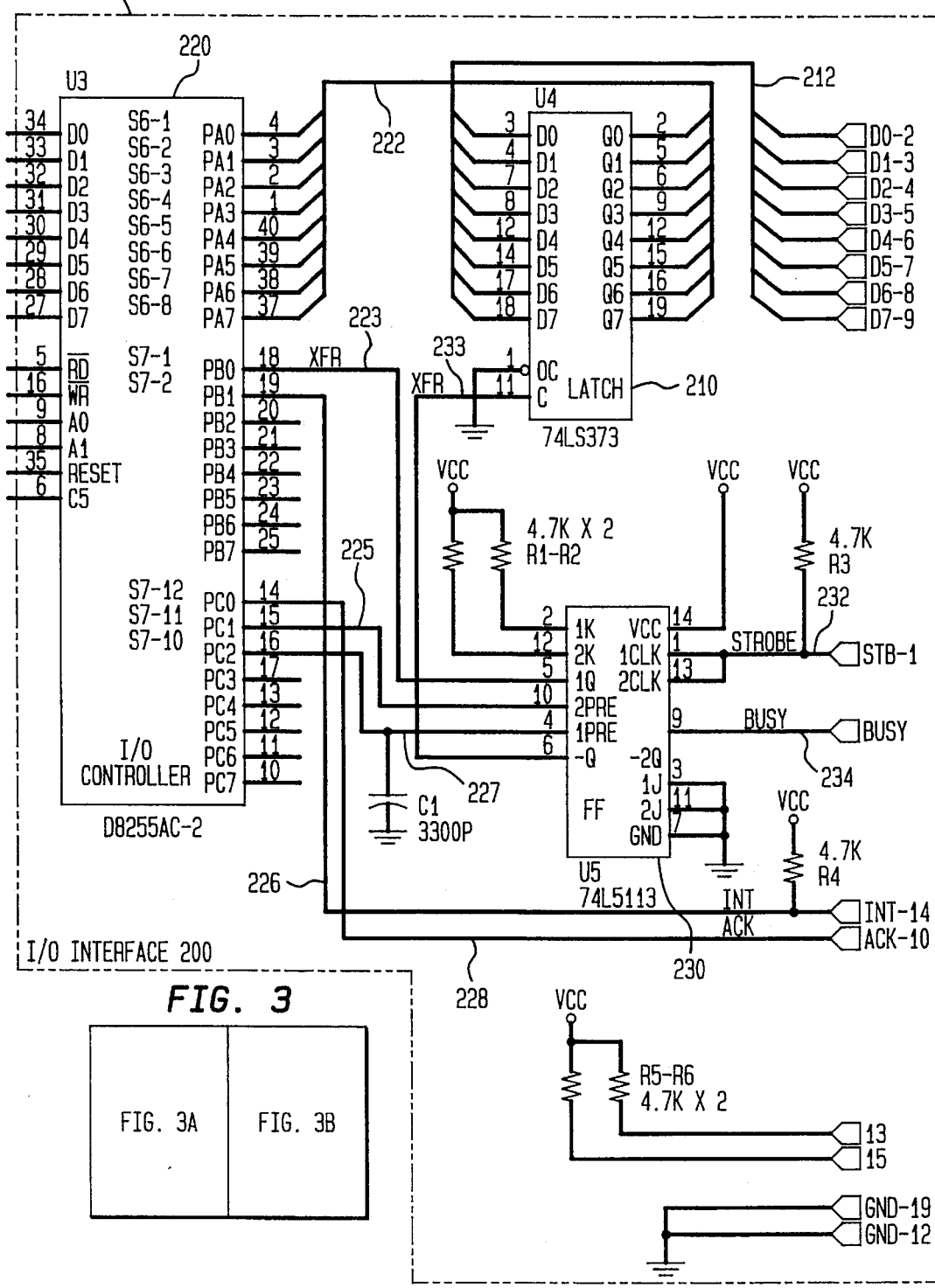

FIG. 3 shows an interface 200 according to the present invention. As shown, The I/O interface 200 is connected to the bus 24 via the I/O expansion port 22. The I/O expansion port 22 includes certain glue logic circuits 23 for transferring data and commands to and from the bus 24.

Data outputted from the printer port 112 (FIG. 1) is received at a latch 210 via data lines 212. Illustratively, the latch is a 74LS373 bus driver circuit with an 8-bit data latch. The latch 210, in turn, may transfer the data stored therein to an I/O controller 220 via data lines 222. The I/O controller 220 can then transfer the data to the bus 24 via the I/O expansion port 22 and the data lines 224.

The I/O controller 220 can receive an interrupt request signal INT from the printer port 112 (FIG. 1) via the command line 226. The I/O controller 220 can also transmit and acknowledge signal ACK to the printer port 112 (FIG. 1) via the command line 228.

The I/O interface 200 also has a flip-flop circuit 230 for maintaining a busy flag and a transfer flag. Illustratively, this flip-flop circuit is a 74LS113 dual JK flip-flop with preset which has two pre-settable flip-flops, one for storing the transfer flag and one for storing the busy flag. The flip-flop circuit 230 receives a strobe signal STR via a command line 232 from the printer port 112 (FIG. 1) at the two clock inputs corresponding to the transfer flag and busy flag flip-flops of the flip-flop circuit 230. The flip-flop circuit 230 transmits the busy flag via a command line 234 to the printer port 112 (FIG. 1). The flip-flop circuit 230 transmits the transfer flag to the I/O controller 220 via the line 223 and the complement of the transfer flag as a clock signal to the latch 210 via line 233. The flip-flop circuit 230 receives from the I/O controller 220 busy flag and transfer flag values to be asynchronously preset in the respective flip-flops via data lines 225 and 227, respectively. The J1 and J2 data storage control signals of the flip-flops of the flip-flop circuit 230 corresponding to the transfer flag and the busy flag, respectively, are connected to ground (e.g., logic '0'). The K1 and K2 data storage control signals of the flip-flops of the flip-flop circuit 230 corresponding to the transfer flag and busy flag, respectively, are connected to a positive reference voltage (e.g., logic '1').

Illustratively, other signals and commands can be transferred to the I/O controller 220 via the bus 24, e.g., from the CPU 12 (FIG. 2). The CPU 12 (FIG. 2) may be programmed with suitable software for operating the I/O controller 220 to achieve the operation described below.

The operation of the interface 200 is now discussed. Initially, the I/O controller 220 presets the busy flag and transfer flag stored in the flip-flop circuit 230 to indicate that the I/O controller 220 is idle (not busy) and that the printer port 112 (FIG. 1) is idle (not transferring data). The I/O controller achieves this by asynchronously transferring appropriate logic values to the pre-set inputs of the flip-flop circuit 230 via the lines 225 and 227. The transfer is asynchronous in that no clock pulse is required for storing the flags.

Suppose, the SEM microscope 100 (FIG. 1) has data that a user desires to transfer to the computer 10 (FIG. 2) which is connected to the printer port 112 (FIG. 1) via the interface 200. The user illustratively instructs the SEM microscope 100 (FIG. 1) to print the data. If necessary, the user also executes appropriate software in the computer 10 (FIG. 2) for receiving data via the interface 200.

According to ordinary printer protocol, the SEM microscope computer 110 (FIG. 1) first determines if the interface 200 is busy by examining the busy flag transmitted via the line 234. If the flag indicates that the I/O controller is not busy (i.e., idle) the SEM microscope computer 110 transmits an interrupt request INT to the I/O controller via the printer port 112 and the command line 226. Upon receiving the interrupt request, the I/O controller 220 responds by transmitting an appropriate acknowledge signal ACK to the SEM microscope computer 110 via the command line 228 and printer port 112.

In response to receiving the acknowledge signal ACK from the I/O controller 220, the SEM microscope computer 110 transmits a strobe signal from the printer port 112 to the flip-flop circuit 230 via line 232. Contemporaneously, the SEM microscope computer 110 transmits a byte of outputted data from the printer port 112 to the latch 210 via the data lines 212.

In response to the strobe signal, the synchronous storage mechanisms of the flip-flops in the flip-flop circuit 230 which store the busy and transfer flags are enabled. The values of the flags stored in these flip-flops are thus changed depending on their corresponding data storage control signals J1, K1 and J2, K2. However, as mentioned above, these control signals are permanently connected to particular logic values thereby always causing the same change in state to the busy and transfer flags. In particular, in response to the strobe signal, the busy flag is always changed to indicate that the I/O controller 220 is busy. Likewise, the transfer flag is always changed to indicate that the printer port 112 is transferring data to the interface 200.

The complement of the transfer flag is connected to a clock input of the latch 210. When the transfer flag is changed from the idle state to the transfer state, a clock pulse is inputted to the latch 210. This causes the latch 210 to store the data inputted on lines 212 (which as mentioned before, is the first byte outputted from the printer port 112).

The state of the busy and transfer flags now indicates that the I/O controller 220 is busy transferring the data to the bus 24 and that the SEM microscope computer 110 is busy transferring data. The I/O controller 220 illustratively asynchronously presets the transfer flag to indicate that the SEM microscope computer 110 is now idle. The I/O controller 220 then attempts to transfer the data from the latch 210 to the bus 24. To do so, the I/O controller 220 must transmit appropriate commands to a bus controller (NOT SHOWN) of the bus 24 and transfer the data at the appropriate moment. The transfer could be delayed depending on traffic on the bus 24 (i.e., usage by other devices). After successfully transferring the data from the latch 210 to the bus 24, the I/O controller 220 asynchronously presets the busy flag to indicate that the I/O controller 220 is idle.

In the meantime, if the SEM microscope computer 110 has additional data to transfer, the SEM microscope computer 110 delays its transfer while the busy flag indicates that the I/O controller 220 is busy. When the I/O controller 220 presets the busy flag to indicate that the I/O controller 220 is idle, the SEM microscope computer 110 initiates its transfer of the next data by repeating the above process (i.e., issuing an interrupt request, etc.)

The actual data received at the computer 10 may include embedded printer commands in addition to the desired data. Illustratively, the software executed by the CPU 12 strips unwanted printer commands from the data and performs other suitable processing on the data for continuing the CD preparation.

In short, an interface for connecting the printer port of an SEM microscope to a computer is disclosed. The interface includes a latch for receiving data outputted from the printer port of the microscope, an I/O controller and a flip-flop circuit. The I/O controller is for transferring data from the latch to a computer bus. The I/O controller also outputs a busy flag indicating that the I/O interface is idle. In addition, the I/O controller outputs an acknowledge signal to the microscope printer port in response to receiving an interrupt request signal therefrom. The flip-flop circuit is for storing the busy flag outputted from the I/O controller. In response to a strobe signal, the flip-flop circuit changes the busy signal to indicate that the I/O controller is busy transferring data. Furthermore, the flip-flop circuit is for enabling the latch to store data transferred from the microscope printer port, in response to the strobe signal.

Finally, the above discussion is intended to be merely illustrative. Those having ordinary skill in the art may devise numerous alternative embodiments without departing from the spirit and scope of the following claims.

I claim:

1. An interface for connecting data from a microscope printer port to a bus of a computer comprising:

a latch which is directly connected to data output lines of said microscope printer port for receiving data transferred thereon, an I/O controller circuit directly connected to said latch for transferring data stored therein to a bus of said computer, for receiving an interrupt signal directly from said printer port of said microscope and for outputting an acknowledgment signal directly to said printer port of said microscope in response thereto, a first flip-flop circuit, for storing a busy flag that indicates whether or not said I/O controller is busy, said first flip-flop circuit having a clock input connected directly to a strobe signal outputted from said microscope printer port and its synchronous data inputs connected directly to ground and Vcc so as to cause said busy flag to transition to indicate that said I/O controller is busy in response to said strobe signal, said first flip-flop outputting said busy flag directly to said microscope printer port, and a second flip-flop for storing a transfer flag that indicates whether or not said microscope printer port is transferring data to said latch, said second flip-flop having a clock input connected directly to said strobe signal outputted from said microscope printer port and its synchronous data inputs directly connected to ground and Vcc so as to cause said transfer flag to transition to indicate that said microscope printer port is transferring said data to said latch in response to said strobe signal, said second flip-flop outputting said transfer flag directly to said I/O controller and a complement of said transfer flag directly to a clock input of said latch so as to cause said latch to store a data value outputted from said microscope printer port when said transfer flag transitions in response to said strobe signal, wherein said I/O controller is directly connected to first and second asynchronous preset inputs of said first and second flip-flop circuits, respectively, said I/O controller initially asynchronously presetting said busy and transfer flags stored in said first and second flip-flops via said first and second asynchronous preset inputs to indicate that said I/O controller is not busy and that said microscope printer port is not transferring data, wherein, in response to said transfer flag, said I/O controller asynchronously presets said transfer flag via said second preset input to indicate that said microscope printer port is not transferring data and transfers said data from said latch when said bus is available for said transfer, and wherein said I/O controller asynchronously presets said busy flag via said first preset input to indicate that said I/O controller is not busy transferring data after, an in response to, transferring said data onto said bus.

2. The interface of claim 1 wherein said microscope printer port refrains from transferring data whenever said busy flag indicates that said I/O controller is busy transferring data, wherein when said microscope printer port has data to transfer to said computer and said busy flag indicates that said I/O controller is not busy, said microscope printer port transmits said interrupt signal, wherein in response to said acknowledgement signal, said microscope printer port transmits said data to said latch and said strobe signal to said first and second flip-flop circuits.

3. A CD data collecting computer comprising:

a CPU, a bus connected to said CPU, and an interface connected to said bus for receiving data from a microscope printer port, said interface comprising:

a latch which is directly connected to data output lines of said microscope printer port for receiving data transferred thereon, an I/O controller circuit directly connected to said latch for transferring data stored therein to a bus of said computer, for receiving an interrupt signal directly from said printer port of said microscope and for outputting an acknowledgment signal directly to said printer port of said microscope in response thereto, a first flip-flop circuit, for storing a busy flag that indicates whether or not said I/O controller is busy, said first flip-flop circuit having a clock input connected directly to a strobe signal outputted from said microscope printer port and its synchronous data inputs connected directly to ground and Vcc so as to cause said busy flag to transition to indicate that said I/O controller is busy in response to said strobe signal, said first flip-flop outputting said busy flag directly to said microscope printer port, and a second flip-flop for storing a transfer flag that indicates whether or not said microscope printer port is transferring data to said latch, said second flip-flop having a clock input connected directly to said strobe signal outputted from said microscope printer port and its synchronous data inputs directly connected to ground and Vcc so as to cause said transfer flag to transition to indicate that said microscope printer port is transferring said data to said latch in response to said strobe signal, said second flip-flop outputting said transfer flag directly to said I/O controller and a complement of said transfer flag directly to a clock input of said latch so as to cause said latch to store a data value outputted from said microscope printer port when said transfer flag transitions in response to said strobe signal, wherein said I/O controller is directly connected to first and second asynchronous preset inputs of said first and second flip-flop circuits, respectively, said I/O controller initially asynchronously presetting said busy and transfer flags stored in said first and second flip-flops via said first and second asynchronous preset inputs to indicate that said I/O controller is not busy and that said microscope printer port is not transferring data, wherein, in response to said transfer flag, said I/O controller asynchronously presets said transfer flag via said second preset input to indicate that said microscope printer port is not transferring data and transfers said data from said latch when said bus is available for said transfer, and wherein said I/O controller asynchronously presets said busy flag via said first preset input to indicate that said I/O controller is not busy transferring data after, and in response to, transferring said data onto said bus.

4. A CD measurement system comprising:

a microscope having a printer port, a computer comprising a CPU, a bus connected to said CPU, and an interface connected to said bus for receiving data from a microscope printer port, said interface comprising:

a latch which is directly connected to data output lines of said microscope printer port for receiving data transferred thereon, an I/O controller circuit directly connected to said latch for transferring data stored therein to a bus of said computer, for receiving an interrupt signal directly from said printer port of said microscope and for outputting an acknowledgment signal directly to said printer port of said microscope in response thereto, a first flip-flop circuit, for storing a busy flag that indicates whether or not said I/O controller is busy, said first flip-flop circuit having a clock input connected directly to a strobe signal outputted from said microscope printer port and its synchronous data inputs connected directly to ground and Vcc so as to cause said busy flag to transition to indicate that said I/O controller is busy in response to said strobe signal, said first flip-flop outputting said busy flag directly to said microscope printer port, and a second flip-flop for storing a transfer flag that indicates whether or not said microscope printer port is transferring data to said latch, said second flip-flop having a clock input connected directly to said strobe signal outputted from said microscope printer port and its synchronous data inputs directly connected to ground and Vcc so as to cause said transfer flag to transition to indicate that said microscope printer port is transferring said data to said latch in response to said strobe signal, said second flip-flop outputting said transfer flag directly to said I/O controller and a complement of said transfer flag directly to a clock input of said latch so as to cause said latch to store a data value outputted from said microscope printer port when said transfer flag transitions in response to said strobe signal, wherein said I/O controller is directly connected to first and second asynchronous preset inputs of said first and second flip-flop circuits, respectively, said I/O controller initially asynchronously presetting said busy and transfer flags stored in said first and second flip-flops via said first and second asynchronous preset inputs to indicate that said I/O controller is not busy and that said microscope printer port is not transferring data, wherein, in response to said transfer flag, said I/O controller asynchronously presets said transfer flag via said second preset input to indicate that said microscope printer port is not transferring data and transfers said data from said latch when said bus is available for said transfer, and wherein said I/O controller asynchronously presets said busy flag via said first preset input to indicate that said I/O controller is not busy transferring data after, and in response to, transferring said data onto said bus.

* * * * *